(12) United States Patent
Zelezniak et al.

(10) Patent No.: US 11,540,330 B2
(45) Date of Patent: Dec. 27, 2022

(54) ALLOCATION OF BASEBAND UNIT RESOURCES IN FIFTH GENERATION NETWORKS AND BEYOND

(71) Applicant: AT&T Intellectual Property I, L.P., Atlanta, GA (US)

(72) Inventors: Aleksandr Zelezniak, Morganville, NJ (US); Minsung Jang, Basking Ridge, NJ (US); Kaustubh Joshi, Short Hills, NJ (US); Xuan Tuyen Tran, Piscataway, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/104,458

(22) Filed: Nov. 25, 2020

(65) Prior Publication Data
US 2022/0167418 A1     May 26, 2022

(51) Int. Cl.
*H04W 80/02*     (2009.01)
*H04W 74/08*     (2009.01)
(Continued)

(52) U.S. Cl.
CPC ..... *H04W 74/0833* (2013.01); *H04W 74/006* (2013.01); *H04W 76/11* (2018.02); *H04W 80/02* (2013.01)

(58) Field of Classification Search
CPC ........... H04W 74/0833; H04W 74/006; H04W 76/11; H04W 80/02
See application file for complete search history.

(56) References Cited

U.S. PATENT DOCUMENTS

| 11,095,559 B1 | 8/2021 | Garvia et al. |
| 11,304,109 B1 | 4/2022 | Potharaju et al. |

(Continued)

FOREIGN PATENT DOCUMENTS

| EP | 3618518 A1 | 3/2020 |
| EP | 3 879 886 A1 | 9/2021 |

(Continued)

OTHER PUBLICATIONS

Jung, et al., "Pooling of Baseband Units in Fifth Generation Networks and Beyond," U.S. Appl. No. 17/653,545, filed Mar. 4, 2022.

(Continued)

*Primary Examiner* — Lakeram Jangbahadur
(74) *Attorney, Agent, or Firm* — Amin, Turocy & Watson, LLP

(57) ABSTRACT

The disclosed technology is directed towards associating a distributed unit (a baseband function) with a radio unit, corresponding to a service area, when the radio unit transitions from an idle state to an active state with respect to serving user equipment. When an idle radio unit receives a message requesting connection from a formerly idle user equipment, or user equipment to be served due to a handover, the message triggers assignment of a distributed unit to the radio unit, whereby the radio unit becomes active to serve the user equipment. If insufficient distributed unit capacity exists, a new distributed unit is dynamically instantiated and assigned to the radio unit. When a radio unit transitions from active to idle, the radio unit is disassociated from the distributed unit. If a distributed unit is not associated with any radio unit, the distributed unit is deactivated to reduce resource consumption.

19 Claims, 13 Drawing Sheets

(51) Int. Cl.
*H04W 76/11* (2018.01)
*H04W 74/00* (2009.01)

(56) References Cited

U.S. PATENT DOCUMENTS

| | | | |
|---|---|---|---|
| 2018/0270869 A1* | 9/2018 | Tsai | H04W 76/27 |
| 2020/0107307 A1 | 4/2020 | Nammi et al. | |
| 2020/0145154 A1 | 5/2020 | Black et al. | |
| 2020/0196220 A1* | 6/2020 | Centonza | H04W 48/02 |
| 2020/0274656 A1* | 8/2020 | Gordaychik | H04L 1/1896 |
| 2020/0351955 A1* | 11/2020 | Jeon | H04L 5/0053 |
| 2022/0159510 A1 | 5/2022 | Jang et al. | |

FOREIGN PATENT DOCUMENTS

| | | | | |
|---|---|---|---|---|
| EP | 3879886 A1 * | 9/2021 | | H04W 48/20 |
| WO | 2020096860 A1 | 5/2020 | | |
| WO | 2020144637 A1 | 7/2020 | | |
| WO | 2021135416 A1 | 7/2021 | | |
| WO | 2022087603 A1 | 4/2022 | | |

OTHER PUBLICATIONS

Zelezniak, et al., "Baseband Unit Pooling Using Shared Scheduler," U.S. Appl. No. 17/809,363, filed Jun. 28, 2022.
Zelezniak, et al., "Sharing of Baseband Units in Fifth Generation Networks and Beyond," U.S. Appl. No. 17/681,511, filed Feb. 25, 2022.
Notice of Allowance received for U.S. Appl. No. 17/098,619 dated Oct. 18, 2022.

* cited by examiner

ALLOCATION OF BASEBAND UNIT RESOURCES IN FIFTH GENERATION NETWORKS AND BEYOND

TECHNICAL FIELD

The subject application relates to wireless communications systems in general, and more particularly to New Radio (NR) including fifth generation (5G) cellular wireless communications systems and/or other next generation networks.

BACKGROUND

In 5G cellular wireless communications systems, the cost of service deployment can be significant because part of 5G uses much higher frequencies than the other wireless technologies such as LTE. The signals using these frequencies allow network service providers to provide significantly faster speeds and larger bandwidth to the customers relative to previous generation technologies. The higher frequency signals, however, travel considerably shorter distances, dissipate much more easily, and penetrate obstacles less than previous generation technologies.

As a result, to provide generally the same service coverage, a 5G service has to have a far-denser deployment than other existing wireless technologies. This causes a substantial burden on any 5G service provider in terms of capital and operational costs.

In general, in the current deployment model, the service providers have to deploy full-fledged baseband units at its service areas, even when the demand is relatively very low; for example, service providers need to overprovision baseband units in anticipation of growing demand. This results in significant monetary investment for what tends to be unnecessary and underutilized baseband units at the initial stage of deployment. Indeed, because of overprovisioning, there is a high likelihood of having idle baseband units that basically do nothing but waste electricity. As the 5G service mandates high-density deployment, this results in a sharp rise in the operational cost of the service providers, particularly the cost of energy.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
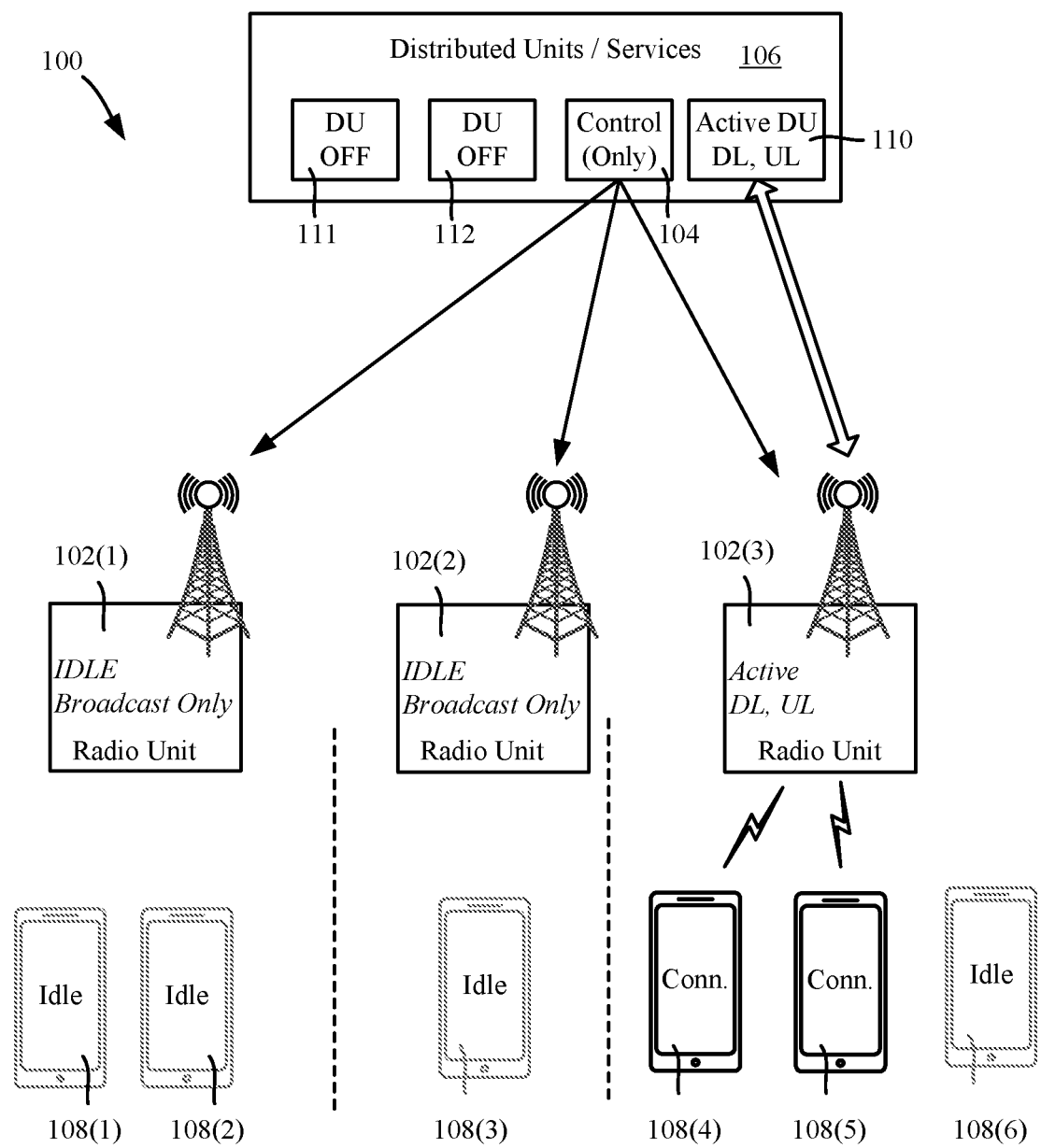
FIGS. 1-5 are block diagrams illustrating an example network communication system over time in which an idle radio unit is assigned a distributed unit (baseband unit function/process) and becomes active when a previously idle user equipment device connects to the system via the radio unit, in accordance with various aspects and embodiments of the subject disclosure.

The technology described herein is generally directed towards functionally disaggregating baseband units into High physical layer (Layer 1, or L1) baseband unit functions and Low physical layer baseband unit functions, and using limiting deployment of the baseband unit functions to those currently in need.

Instead of deploying full-fledged baseband units for every service area, the technology includes starting with a minimum number of High L1 units providing minimum (or at least significantly reduced) services for cell sites to operate (such as to support user equipment in the idle state). Note that to distinguish a full-fledged baseband unit from one with disaggregated functions, in general the term "distributed unit" is used herein for High physical layer unit functions, and the term "radio unit" is used for the Low physical layer unit functions. The distributed unit can be a software-defined network function that can be activated as needed and deactivated/decommissioned when no longer needed.

To facilitate reduced services, when the user equipment devices in a service area are in an Idle state, only control information is broadcast to that service area. This eliminates the need for fully operational baseband unit services. When a user equipment device is transitioning from an Idle state to a Connected state, the first message the user equipment device sends to the network is a PRACH (Physical Random Access Channel) message. As described herein, this message results in the assignment of a baseband unit process to the radio unit serving that user equipment device.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, three example service areas are shown as represented by the radio units 102(1)-102(3) coupled to antennas. As is understood, this is only an example, as any practical number of service areas may be present in a given system.

In FIG. 1, the radio units 102(1) and 102(2) are in an idle state, receiving control information broadcast by (e.g., a PRACH broadcast device 104 of) distributed units/services 106 of the system 100. Broadcasting such control information only consumes a relatively small amount of resources, even when broadcasting to a relatively large number of cells. This is because the only user equipment devices 104(1)-104(3) powered on in those service areas are in idle states.

The radio unit 102(3) is serving two user equipment devices 108(4) and 108(5) that are in connected states, and thus the radio unit 102(3) is active with respect to downlink (DL) and uplink (UL) communications. As such, a distributed unit 110 is active to handle the communications to and from the radio unit 102(3). Note that more than one distributed unit can be active, although as shown in FIG. 1, the distributed units 111 and 112 are off (deactivated), which conserves significant resources. Note further that the user equipment device 108(6) is in the service area corresponding to the radio unit 102(3), but is in an idle state.

Figure 2:
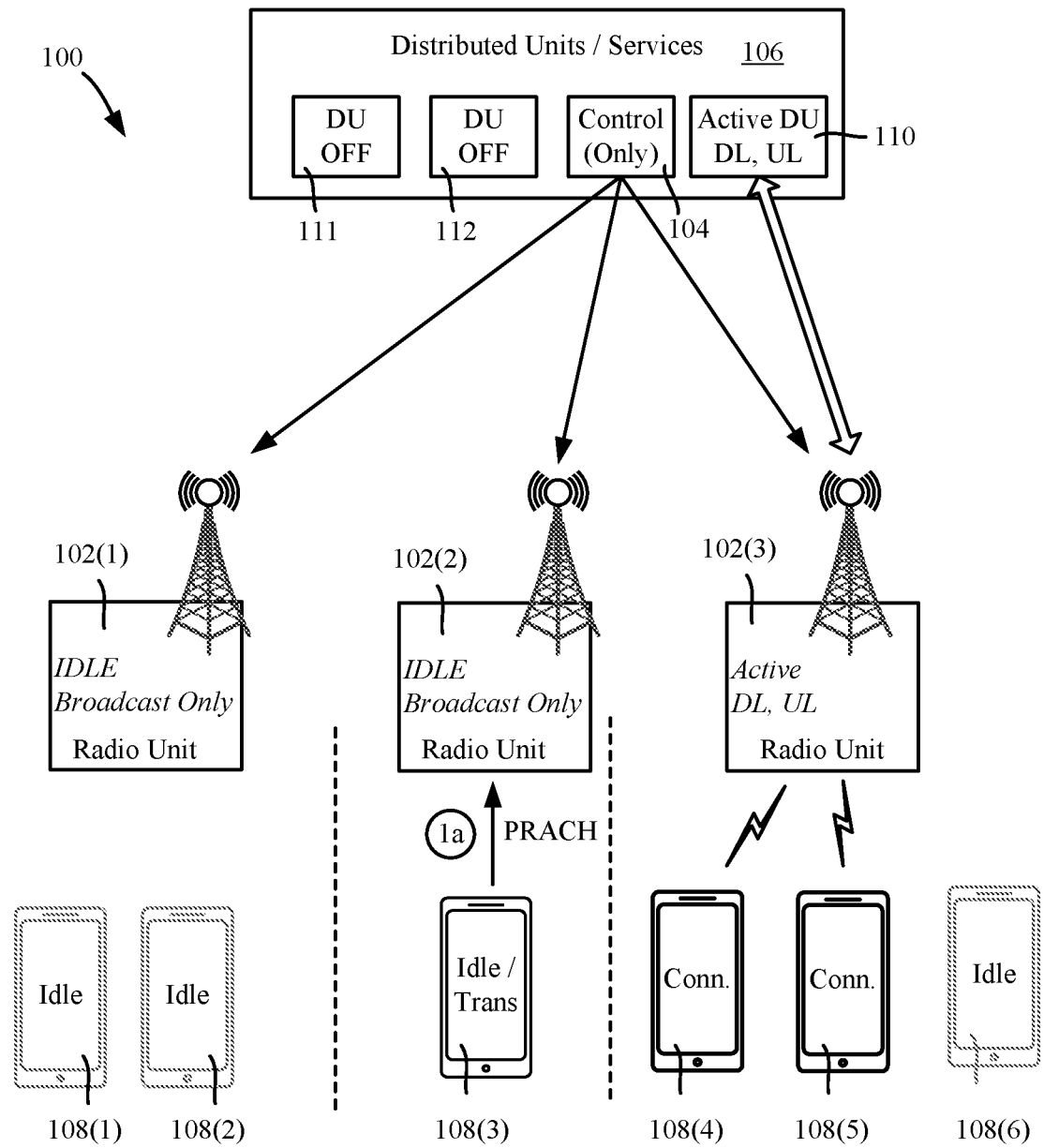

In FIG. 2, the user equipment device 108(3) is shown as transitioning to a connected state. As is known, this process starts with a PRACH message (the arrow labeled 1a) sent from the user equipment device 108(3) within a service area, which in this example corresponds to the radio unit 102(2).

Figure 3:
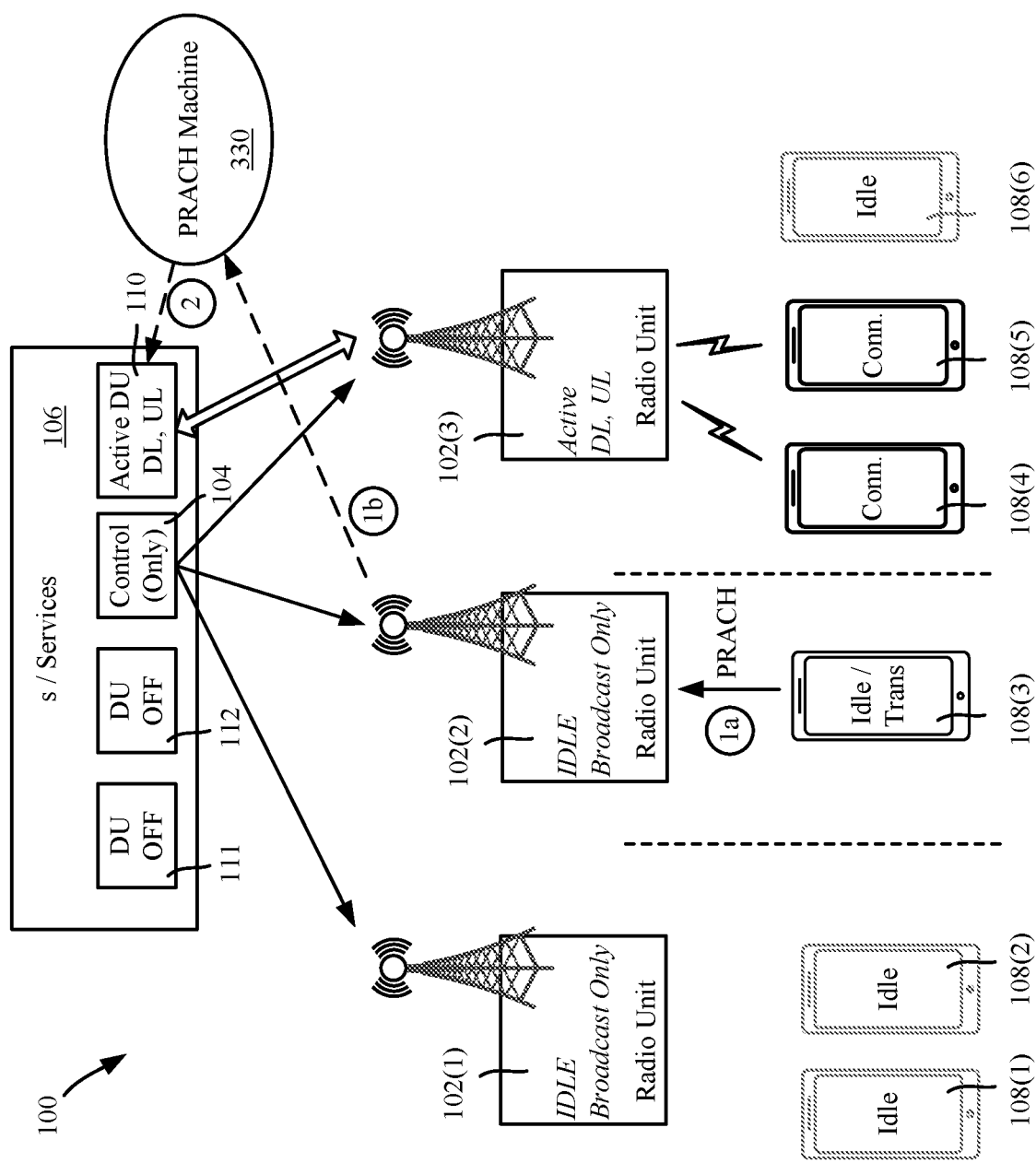

In FIG. 3, the PRACH message is forwarded to a PRACH handler (machine) 330 (arrow 1b), which can be implemented as part of the distributed units/services 106. One implementation for directing the message to the PRACH machine 330 is described below with reference to FIG. 5. As shown by the arrow labeled two (2), the PRACH machine 330 allocates a distributed unit (baseband unit process) process to handle the radio unit 102(2), which in this example is the distributed unit 110, and forwards the PRACH message to that distributed unit 110. Note that if there is no distributed unit (baseband unit) capacity currently available, the PRACH machine 330 can instantiate a new distributed unit and assign the new distributed unit to the radio unit 102(2).

Figure 4:
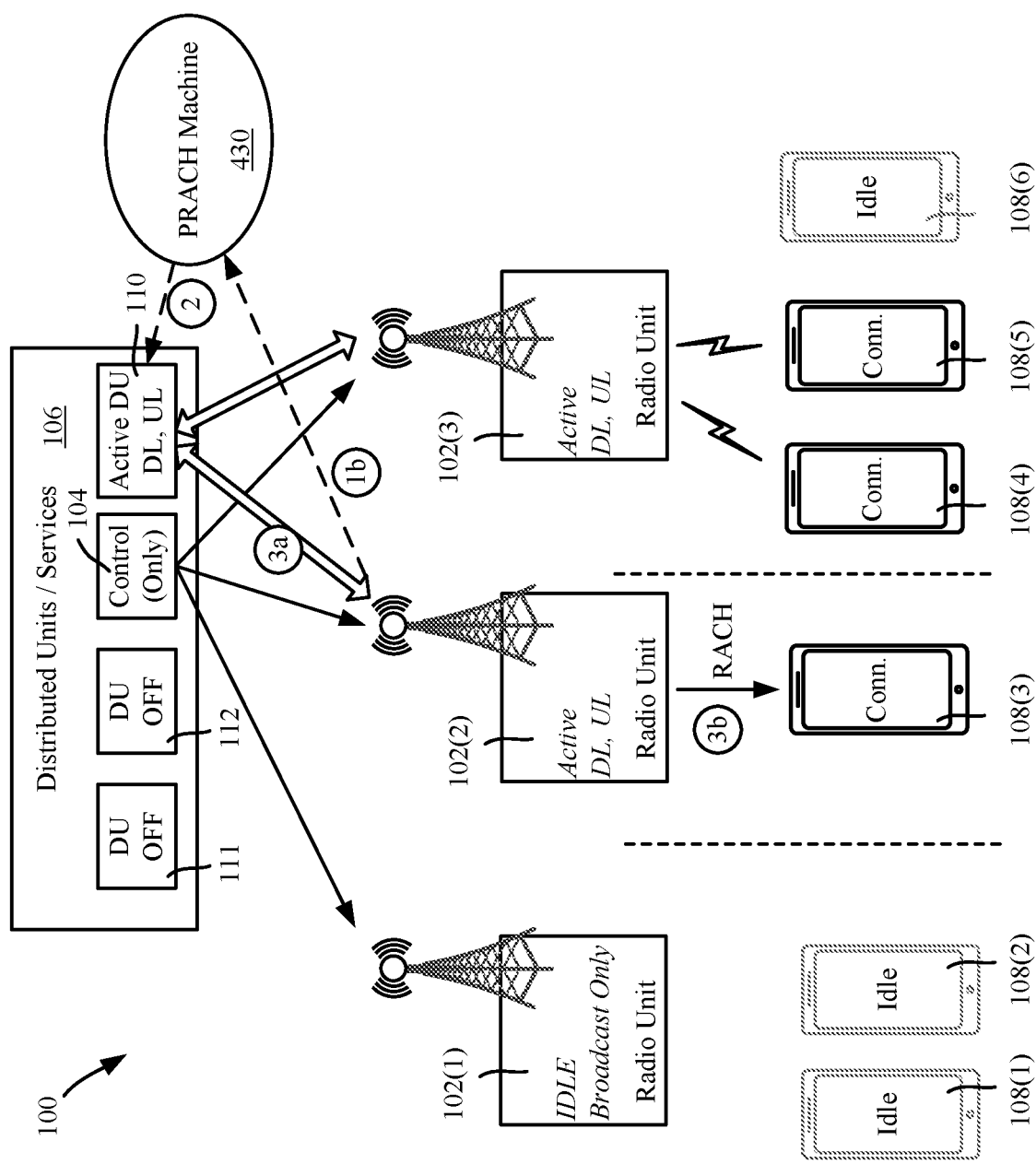
Figure 5:
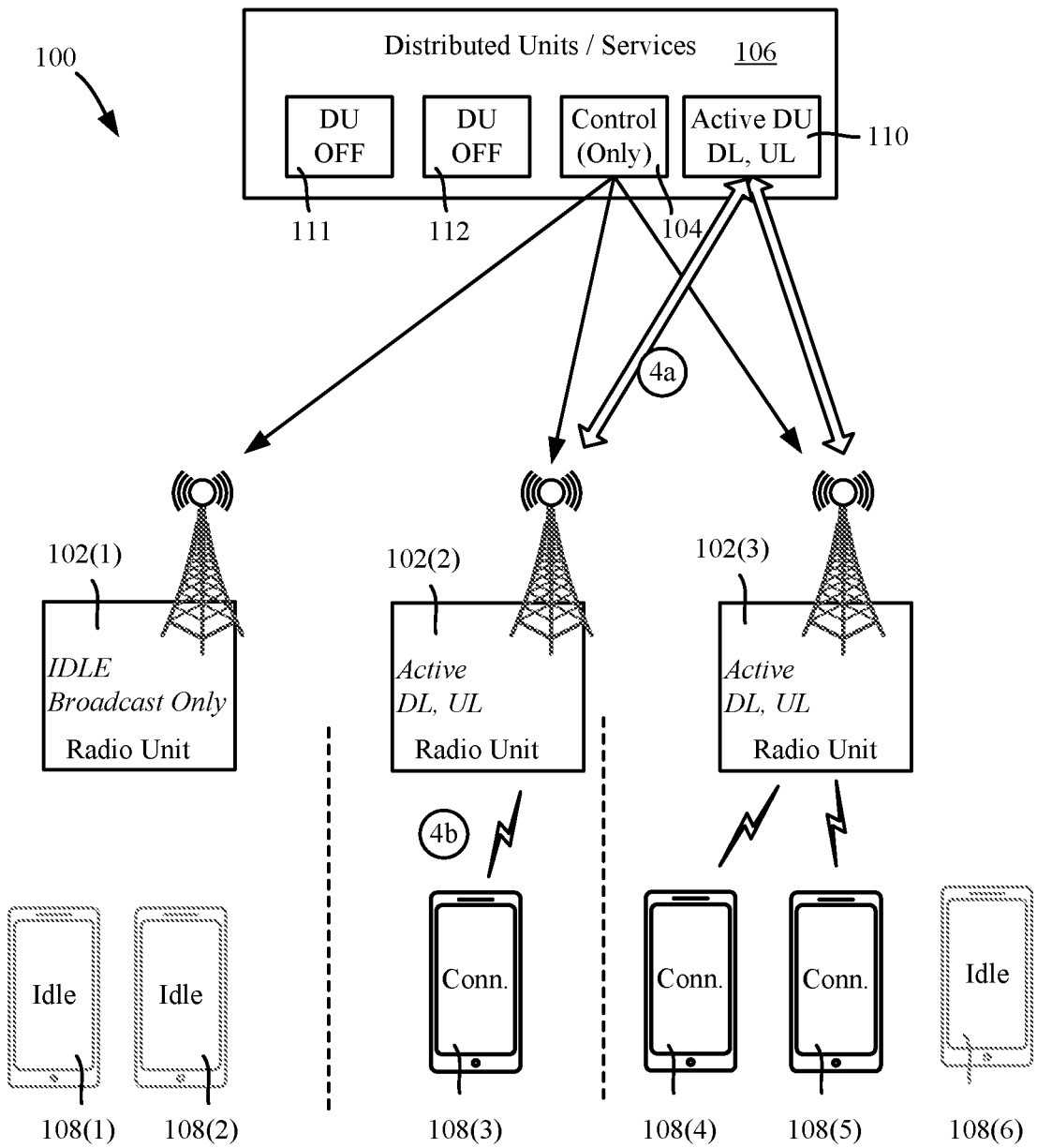

In the example of FIG. 4, the distributed unit 110 sends a RACH response (arrow 3*a*) to the radio unit 102(2), which sends the response (arrow 3*b*) to the to the user equipment 108(3). The user equipment is now in a connected state, and the radio unit 102(2) is now active for downlink and uplink communications to and from the user equipment 108(3). FIG. 5 shows such data communications (arrow 4*a*) between the distributed unit and the radio unit 102(2), and between (arrow 4*a*) the radio unit 102(2) and the now connected user equipment device 108(3).

Figure 6:
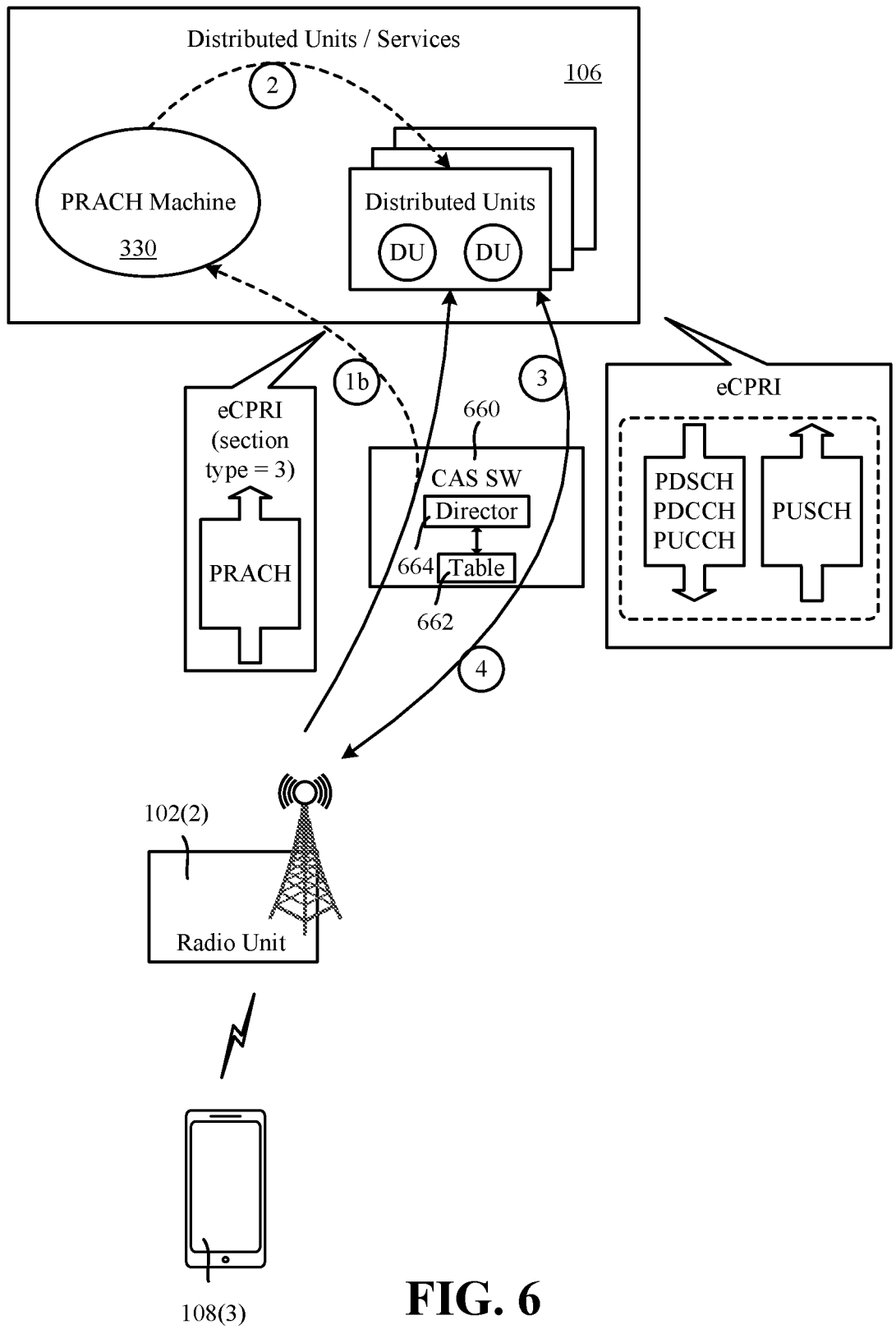
FIG. 6 is a block/dataflow diagram illustrating an example of a switch directing a connection request (PRACH message) from a radio unit to a message handler (PRACH machine) that allocates and assigns a distributed unit to the radio unit, in accordance with various aspects and embodiments of the subject disclosure.
Figure 7:
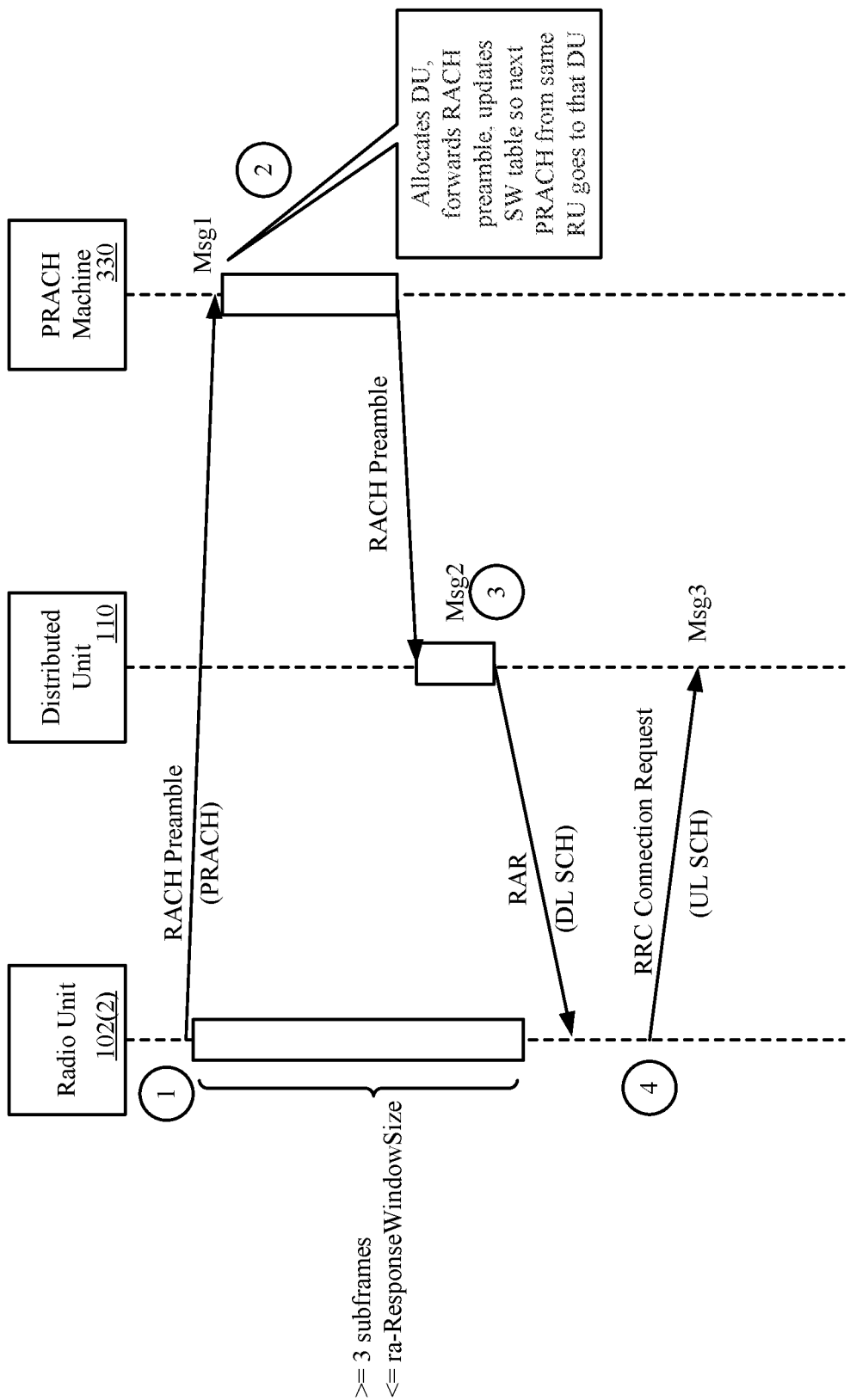
FIG. 7 is a dataflow diagram representing messages and message handling generally corresponding to messages communicated in FIG. 6, in accordance with various aspects and embodiments of the subject disclosure.

FIGS. 6 and 7 show additional details of the above process in one example implementation in which a CAS switch 660 receives the PRACH message (Msg 1) and directs it to the PRACH machine 330. Note that in this implementation, the CAS switch 660 maintains a data structure (e.g., a table 662) that maps distributed units to radio units (their media access control (MAC) addresses), and if no distributed unit exists in the table 662 for the MAC address of the radio unit 102(2), a PRACH director 664 (e.g., a process) implemented in the CAS switch 660 directs the PRACH message (Msg 1) to the PRACH machine 330 (arrow 1*b*). If a distributed unit already exists in the table 662, e.g., another user equipment is connected via the radio unit 102(2) and therefore has an assigned distributed unit, the CAS switch (or the radio unit) forwards the PRACH message (Msg 1) directly to the distributed unit.

As described herein and as represented by arrow 2, the PRACH machine 330 allocates a distributed unit/baseband unit process (e.g., the distributed unit 110) to handle the radio unit 102(2), and forwards Msg 1 to that distributed unit 110. Note that the CAS switch table 662 is updated, e.g., by the PRACH machine 330, to relate the distributed unit to the radio unit 102(2) for further communications.

As represented via Msg 2/arrow 3 in FIGS. 6 and 7, the assigned distributed unit 110 obtains information (including the RACH preamble) from the PRACH machine, and sends a RACH response (Msg 2/arrow 3) to the user equipment 108(3) via the radio unit 102(2). This can include information related to random access response (RAR) downlink scheduling (e.g., downlink data when the user equipment device 108(3) is in a "non-synchronized" state. Arrow 4 represents further data communications between the distributed unit and the radio unit 102(2), including radio resource control (RRC) connection establishment/uplink scheduling data (e.g., uplink data when the user equipment device 108(3) is in a "non-synchronized" state.

Figure 8:
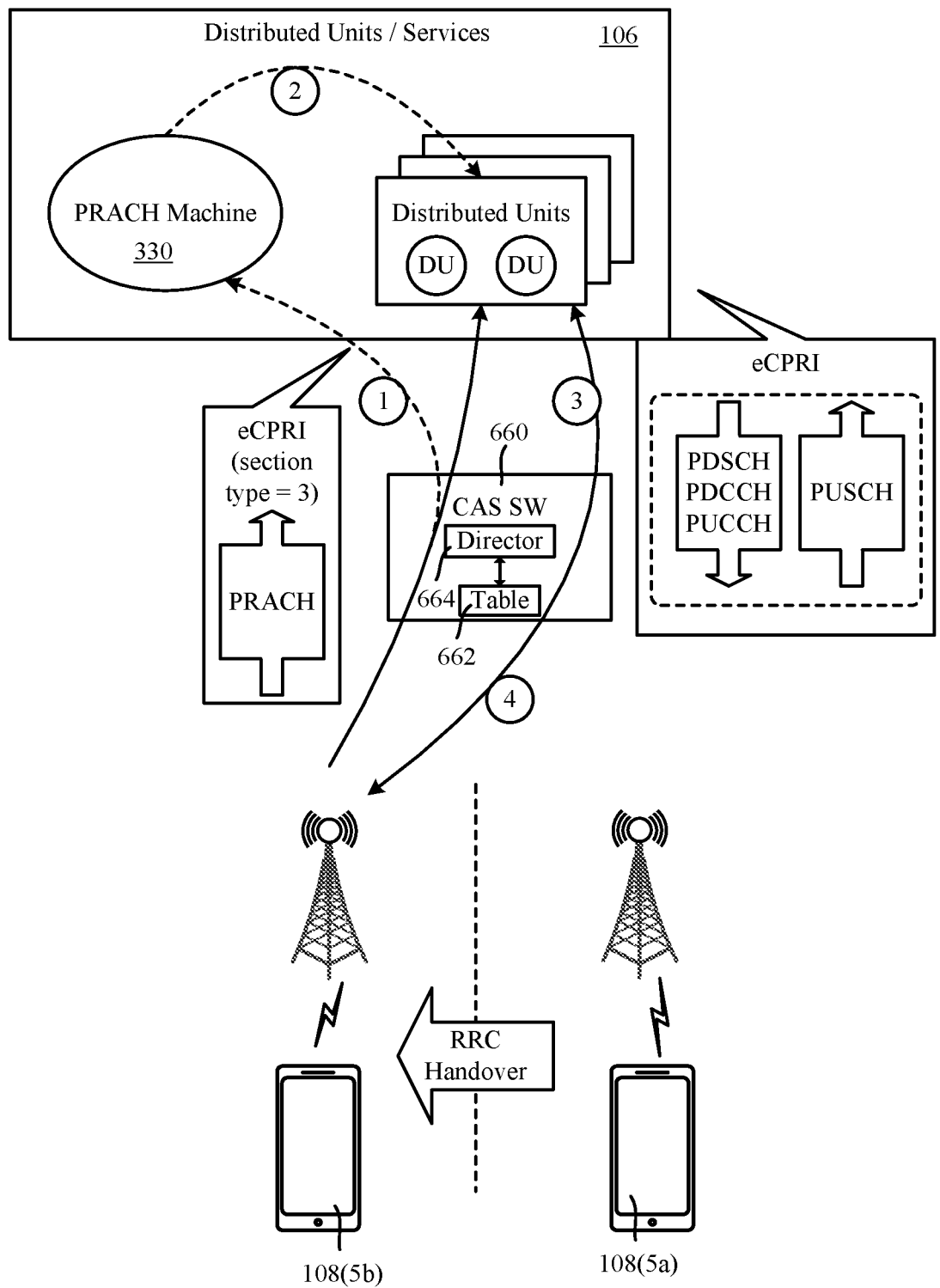
FIG. 8 is a block diagrams illustrating an example network communication system in which a user equipment handover occurs from one service area corresponding to a radio unit to another service area/radio unit, in accordance with various aspects and embodiments of the subject disclosure.

FIG. 8 shows how the process is generally repeated upon RRC handover. Note that the PRACH machine 330 is only involved if the new service area's radio unit is not already mapped to a distributed unit.

Note that if a distributed unit is coupled to one or more radio units that are idle, the distributed units/services 106 can decommission the distributed unit and update the table 662. The table 662 can be updated to remove a radio unit/distributed unit mapping if the user equipment devices are idle (or none are present) in the service area corresponding to the radio unit. As previously set forth with reference to FIG. 1, some functionality remains present (e.g. the physical broadcast channel (PBCH) broadcasts the parameters needed for initial access to the cell).

Figure 9:
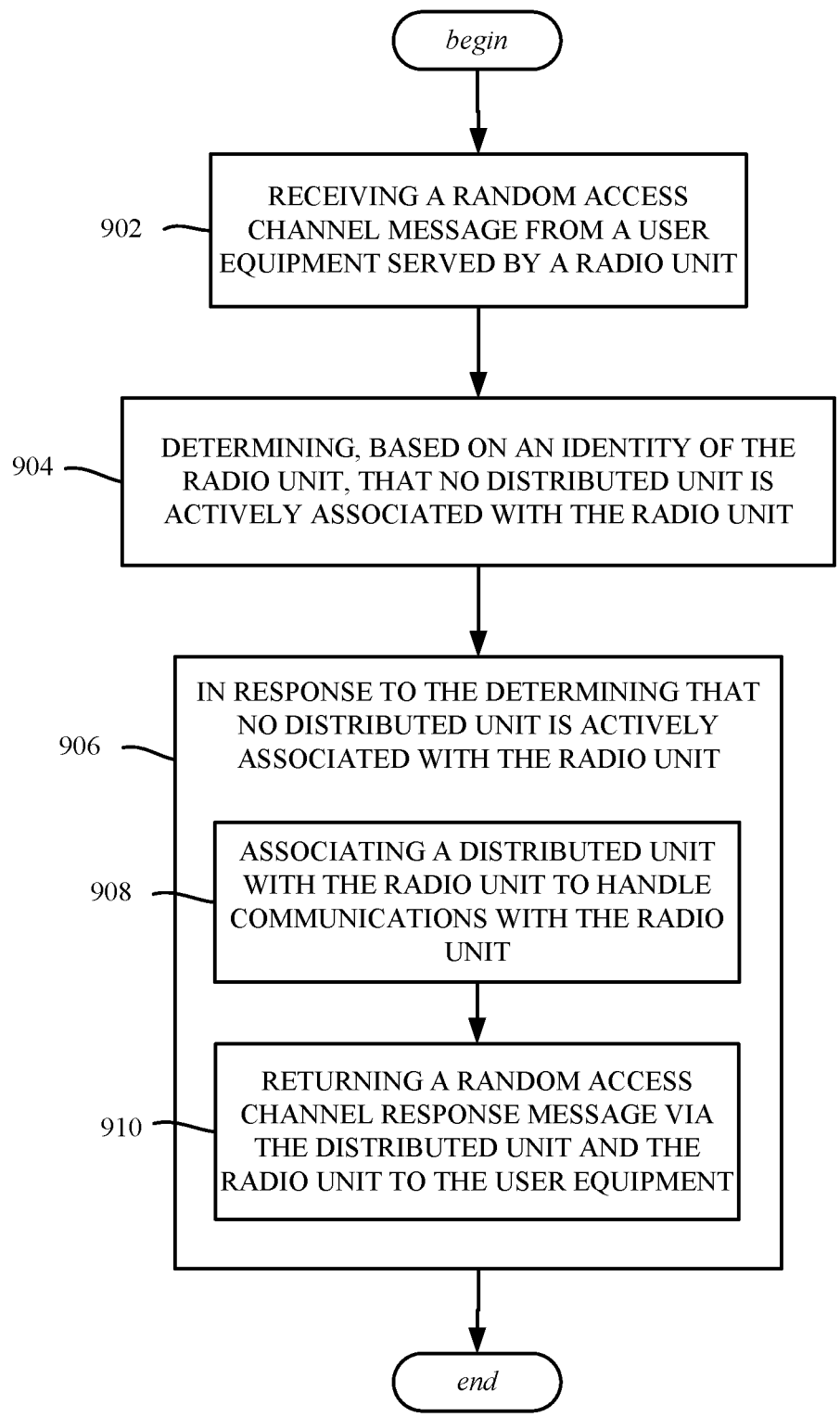
FIG. 9 illustrates example operations related to associating a distributed unit with a radio unit that is not actively associated with a distributed unit, to handle communications with the radio unit, in accordance with various aspects and embodiments of the subject disclosure.

One or more example aspects are represented in FIG. 9, and can correspond to a system, comprising a processor, and a memory that stores executable instructions that, when executed by the processor of the system, facilitate performance of operations. Example operation 902 represents receiving a random access channel message from a user equipment served by a radio unit. Example operation 904 represents determining, based on an identity of the radio unit, that no distributed unit is actively associated with the radio unit. Example operation 906 represents, in response to the determining that no distributed unit is actively associated with the radio unit, associating a distributed unit with the radio unit to handle communications with the radio unit (operation 908), and returning a random access channel response message via the distributed unit and the radio unit to the user equipment (operation 910).

The identity of the radio unit can correspond to a media access control address of the radio unit, and determining, based on the identity of the radio unit, that no distributed unit is actively associated with the radio unit can include accessing a mapping data structure that relates active distributed units to media access control addresses of radio units.

The system can include a switch that couples radio units to active distributed units, and accessing the mapping data structure can be performed by a director process of the switch.

Associating the distributed unit with the radio unit can include directing the random access channel message to a physical random access channel handler that assigns an active distributed unit to the radio unit. The identity of the radio unit can correspond to a media access control address of the radio unit, and determining that no distributed unit is actively associated with the radio unit can include accessing a mapping data structure that relates active distributed units to media access control addresses of radio units; further operations can include maintaining the mapping data structure to relate the active distributed unit to the radio unit.

Associating the distributed unit with the radio unit can include directing the random access channel message to a physical random access channel handler, and further operations can include determining at the physical random access channel handler that insufficient distributed unit capacity exists, instantiating a new distributed unit to increase distributed unit capacity, and assigning the new distributed unit to the radio unit. The identity of the radio unit can correspond to a media access control address of the radio unit, and determining that no distributed unit is actively associated with the radio unit can include accessing a mapping data structure that relates active distributed units to media access control addresses of radio units, and further operations can include, maintaining the mapping data structure to relate the new distributed unit to the radio unit.

Further operations can include performing a handover of the user equipment to a second radio unit, determining, based on an identity of the second radio unit, that no distributed unit is actively associated with the second radio unit, and in response to the determining that no distributed unit is actively associated with the second radio unit, associating a distributed unit with the second radio unit to handle communications with the second radio unit. Further operations further can include determining that the first radio unit has entered an idle state with respect to not serving any active user equipment, and in response to determining that the first radio unit has entered the idle state, disassociating the distributed unit from the first radio unit, and broadcasting control information to the first radio unit.

The distributed unit can comprise a software-defined network function.

Figure 10:
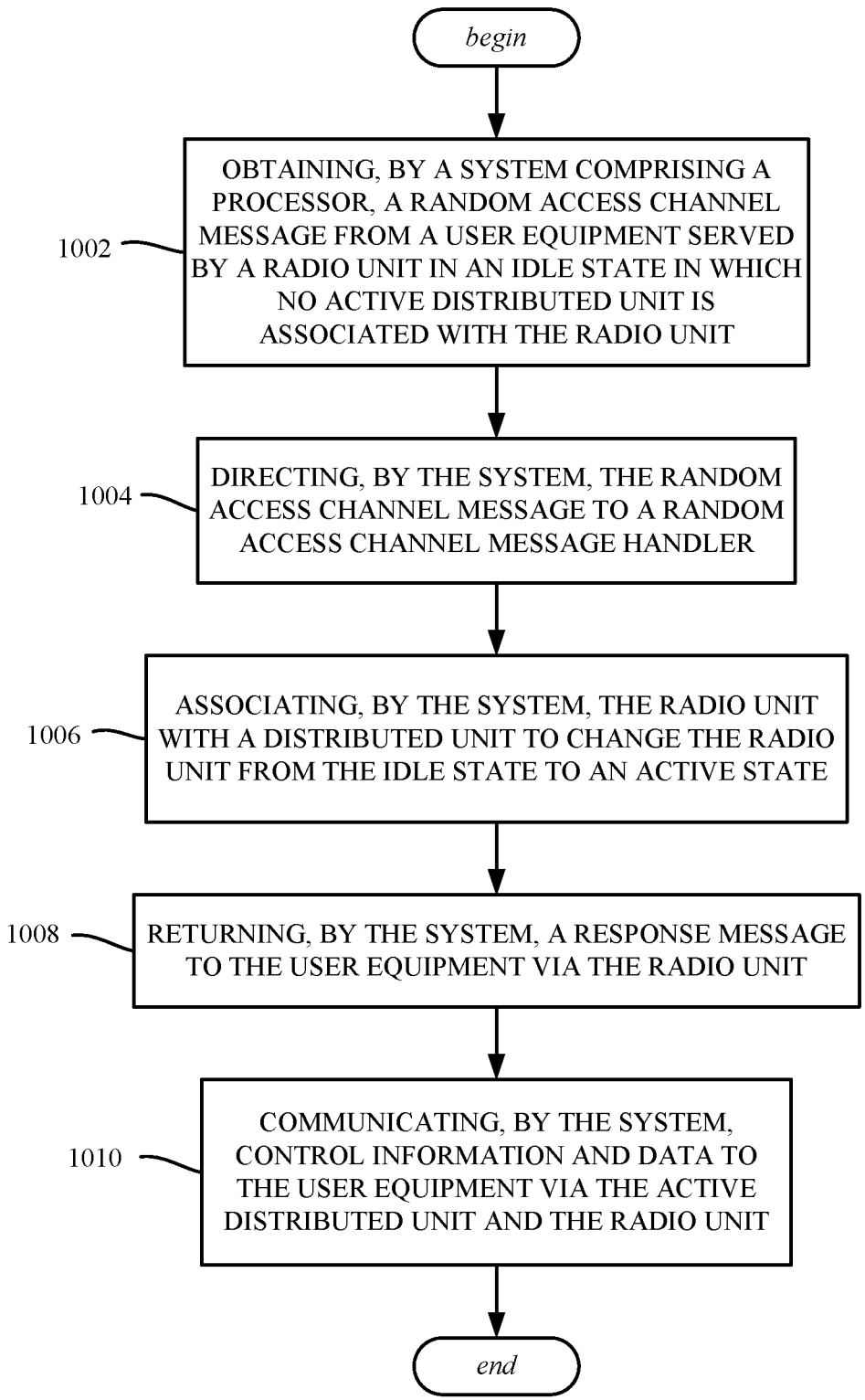
FIG. 10 illustrates example operations related to associating a radio unit with a distributed unit to change the radio unit from an idle state to an active state, in accordance with various aspects and embodiments of the subject disclosure.

One or more example aspects are represented in FIG. 10, and can correspond to example operations of a method. Operation 1002 represents obtaining, by a system comprising a processor, a random access channel message from a user equipment served by a radio unit in an idle state in which no active distributed unit is associated with the radio unit. Operation 1004 represents directing, by the system, the random access channel message to a random access channel message handler. Operation 1006 represents associating, by the system, the radio unit with a distributed unit to change the radio unit from the idle state to an active state. Operation 1008 represents returning, by the system, a response message to the user equipment via the radio unit. Operation 1010 represents communicating, by the system, control information and data to the user equipment via the active distributed unit and the radio unit.

Associating the radio unit with the distributed unit can include selecting a currently active distributed unit, and relating a media access control address of the radio unit to an identifier of the currently active distributed unit.

Associating the radio unit with the distributed unit can include instantiating a new active distributed unit, and relating a media access control address of the radio unit to an identifier of the new active distributed unit.

The distributed unit and the random access channel message handler can be incorporated into a distributed unit service, obtaining the random access channel message from the user equipment can be performed by a switch that couples the radio unit to the distributed unit service, and directing the random access channel message to the random access channel message handler can be performed by a director process of the switch.

The radio unit can be a first radio unit, and aspects can include performing, by the system, a handover of the user equipment to a second radio unit, which can include associating the distributed unit with the second radio unit to handle communications with the second radio unit.

The distributed unit and the random access channel message handler can be incorporated into a distributed unit service; aspects can include determining, by the system, that the first radio unit has entered an idle state, and in response to determining that the first radio unit has entered the idle state, disassociating, by the system, the distributed unit from the first radio unit, and broadcasting, by the system, control information from a broadcast component of the distributed unit service to the first radio unit.

Figure 11:
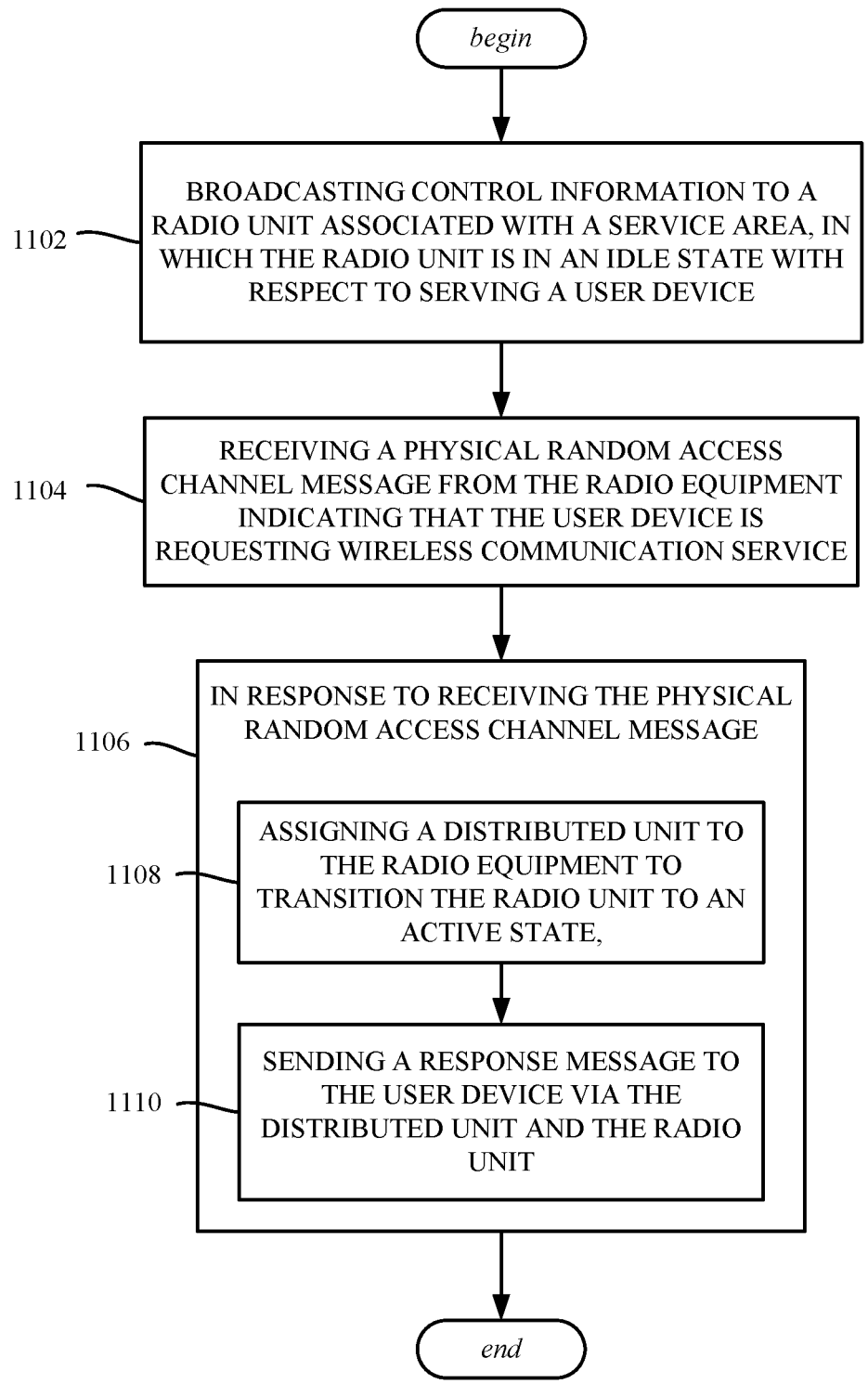
FIG. 11 illustrates example operations related to assigning a distributed unit to a radio equipment to transition the radio unit to an active state for sending a response message to the user device via the distributed unit and the radio unit, in accordance with various aspects and embodiments of the subject disclosure.

One or more aspects are represented in FIG. 11, such as implemented in a machine-readable medium, comprising executable instructions that, when executed by a processor, facilitate performance of operations. Example operation 1102 represents broadcasting control information to a radio unit associated with a service area, in which the radio unit is in an idle state with respect to serving a user device. Example operation 1104 represents receiving a physical random access channel message from the radio equipment indicating that the user device is requesting wireless communication service. Example operation 1106 represents, in response to receiving the physical random access channel message, assigning a distributed unit to the radio equipment to transition the radio unit to an active state (operation 1108), and sending a response message to the user device via the distributed unit and the radio unit (operation 1110).

Assigning the distributed unit to the radio equipment can include selecting an existing distributed unit, and associating an access control layer address of the radio unit with an identifier of the existing distributed unit.

Assigning the distributed unit to the radio equipment can include instantiating a new distributed unit, and associating an access control layer address of the radio unit with an identifier of the new distributed unit.

Assigning the distributed unit to the radio equipment can include associating a media access control layer address of the radio unit with an identifier of the distributed unit, and further operations can include determining that the radio equipment is no longer serving any user device, and disassociating the media access control layer address of the radio unit with the identifier of the distributed unit to retransition the radio unit to the idle state.

As can be seen, the technology described herein provides a cost-effective way to deploy baseband units for 5G services and beyond. The technology facilitates cost saving by allocating resources to meet the actual, current demand of the network service as radio units change from idle to active and vice-versa over time. Moreover, the technology contributes to the reduction of operational costs, such as energy cost, by appropriately adjusting the network capability based on demand.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 12:
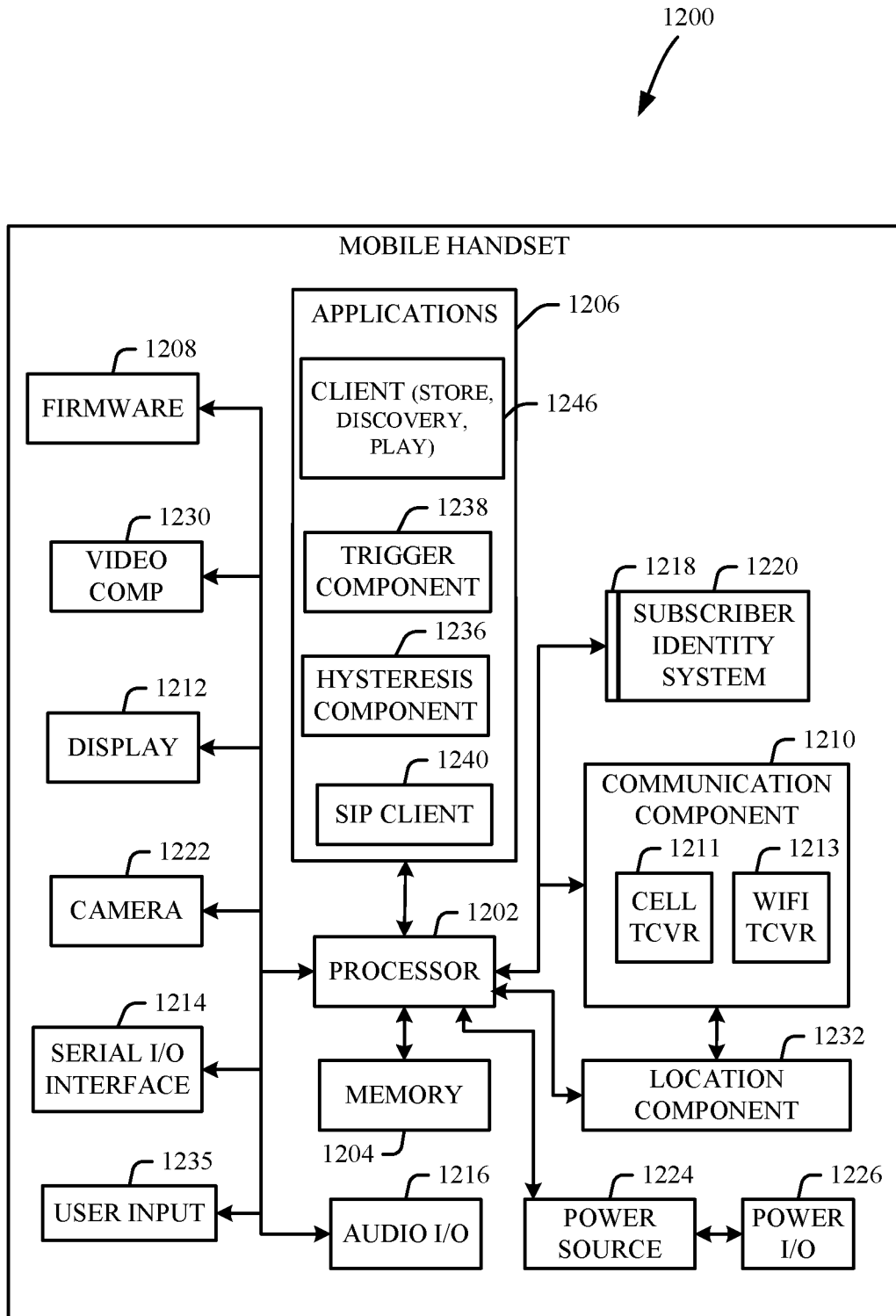
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device (such as a user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
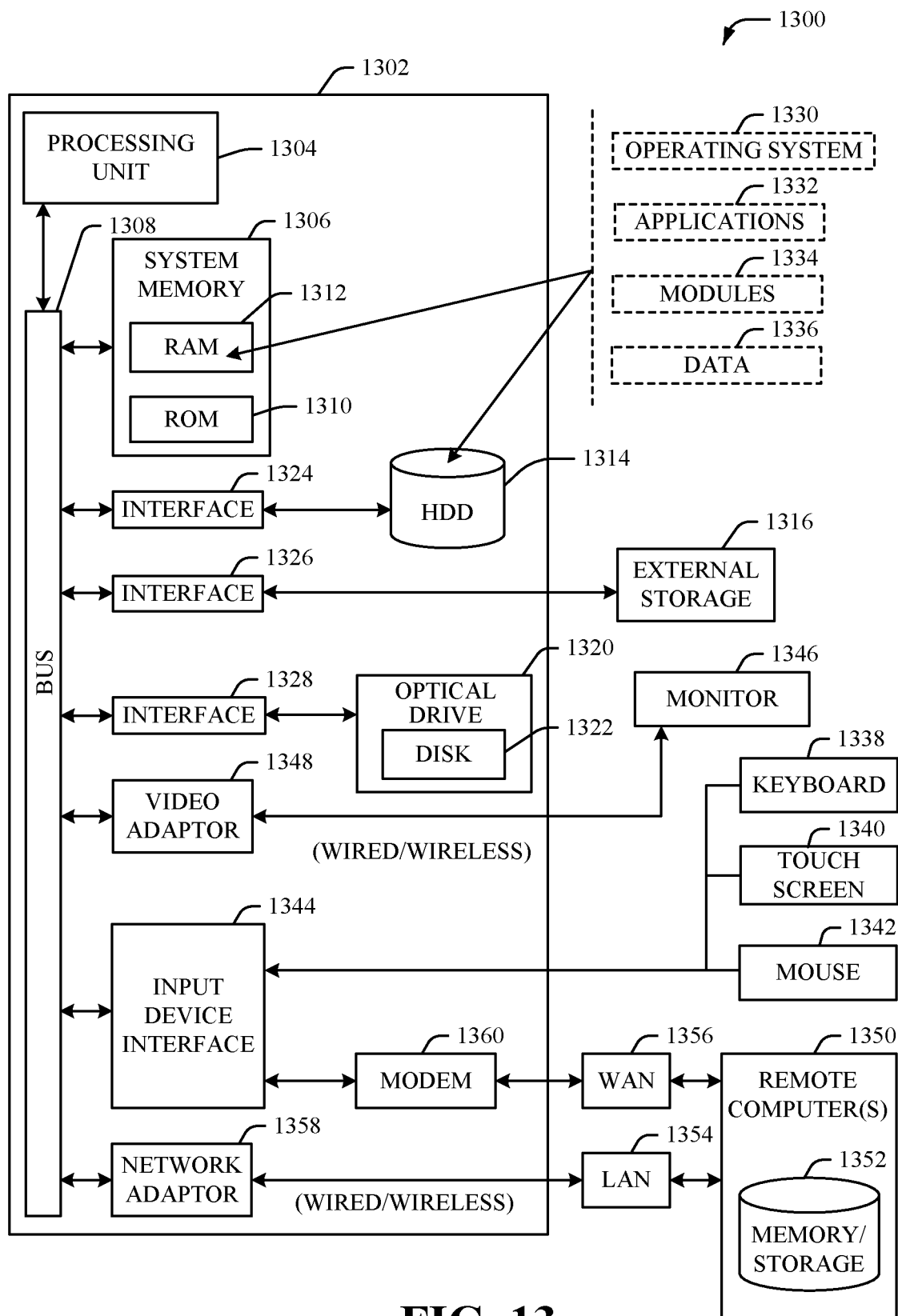
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1294 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
    a processor; and
    a memory that stores executable instructions which, when executed by the processor of the system, facilitate performance of operations, the operations comprising:
        receiving a random access channel message from a user equipment served by a radio unit;
        determining, based on an identity of the radio unit, that no distributed unit is actively associated with the radio unit, wherein the identity of the radio unit corresponds to a media access control address of the radio unit, and the determining that no distributed unit is actively associated with the radio unit comprises accessing a mapping data structure that relates active distributed units to media access control addresses of radio units;
        in response to the determining that no distributed unit is actively associated with the radio unit, associating a distributed unit of the network equipment with the radio unit to handle communications with the radio unit, and returning a random access channel response message via the distributed unit and the radio unit to the user equipment wherein associating the distributed unit with the radio unit comprises directing the random access channel message to a physical random access channel handler machine that assigns an active distributed unit to the radio unit; and
        maintaining the mapping data structure to relate the active distributed unit to the radio unit.

2. The network equipment of claim 1, wherein the system comprises a switch that couples radio units to active distributed units, and wherein accessing the mapping data structure is performed by a director process executing on the switch.

3. The network equipment of claim 1, wherein the operations further comprise determining at the physical random access channel handler that insufficient distributed unit capacity exists, instantiating a new distributed unit to increase distributed unit capacity, and assigning the new distributed unit to the radio unit.

4. The network equipment of claim 3, wherein the operations further comprise, maintaining the mapping data structure to relate the new distributed unit to the radio unit.

5. The network equipment of claim 1, wherein the radio unit is a first radio unit, and wherein the operations further comprise performing a handover of the user equipment to a second radio unit, determining, based on an identity of the second radio unit, that no distributed unit is actively associated with the second radio unit, and in response to the determining that no distributed unit is actively associated with the second radio unit, associating a distributed unit with the second radio unit to handle communications with the second radio unit.

6. The network equipment of claim 5, wherein the operations further comprise determining that the first radio unit has entered an idle state with respect to not serving any active user equipment, and in response to the determining that the first radio unit has entered the idle state, disassociating the distributed unit from the first radio unit, and broadcasting control information to the first radio unit.

7. The method of claim 5, wherein the distributed unit comprises a software-defined network function.

8. The non-transitory machine-readable medium of claim 7, wherein the distributed unit comprises a software-defined network function.

9. The network equipment of claim 1, wherein the distributed unit comprises a software-defined network function.

10. A method, comprising:
    obtaining, by network equipment comprising a processor, a random access channel message from a user equipment served by a first radio unit in an idle state in which no active distributed unit is associated with the first radio unit;
    directing, by the network equipment, the random access channel message to a random access channel message handler;
    associating, by the network equipment, the first radio unit with a distributed unit to change the first radio unit from the idle state to an active state, wherein the distributed unit and the random access channel message handler are incorporated into a distributed unit service;
    returning, by the network equipment, a response message to the user equipment via the first radio unit;
    communicating, by the network equipment, first control information and data to the user equipment via the distributed unit and the first radio unit;
    performing, by the network equipment, a handover of the user equipment to a second radio unit, comprising associating the distributed unit with the second radio unit to handle communications with the second radio unit;

in response to determining that the first radio unit has entered an idle state:
  disassociating, by the network equipment, the distributed unit from the first radio unit, and
  broadcasting, by the network equipment, second control information from a broadcast component of the distributed unit service to the first radio unit.

11. The method of claim 10, wherein associating the radio unit with the distributed unit comprises selecting a currently active distributed unit, and relating a media access control address of the radio unit to an identifier of the currently active distributed unit.

12. The method of claim 10, wherein associating the radio unit with the distributed unit comprises instantiating a new active distributed unit, and relating a media access control address of the radio unit to an identifier of the new active distributed unit.

13. The method of claim 10, wherein obtaining the random access channel message from the user equipment is performed by a switch that couples the radio unit to the distributed unit service, and wherein directing the random access channel message to the random access channel message handler is performed by a director process of the switch.

14. A non-transitory machine-readable medium, comprising executable instructions that, when executed by a processor of network equipment, facilitate performance of operations, the operations comprising:
  receiving a random access channel message from a user equipment served by a radio unit;
  determining, based on an identity of the radio unit, that no distributed unit is actively associated with the radio unit, wherein the identity of the radio unit corresponds to a media access control address of the radio unit, and the determining that no distributed unit is actively associated with the radio unit comprises accessing a mapping data structure that relates active distributed units to media access control addresses of radio units;
  in response to the determining that no distributed unit is actively associated with the radio unit, associating a distributed unit with the radio unit to handle communications with the radio unit, and returning a random access channel response message via the distributed unit and the radio unit to the user equipment, wherein associating the distributed unit with the radio unit comprises:
    directing the random access channel message to a physical random access channel handler machine;
    determining at the physical random access channel handler that insufficient distributed unit capacity exists;
    instantiating a new distributed unit on the network equipment to increase distributed unit capacity;
    assigning the new distributed unit as the distributed unit associated with the radio unit; and
    maintaining the mapping data structure to relate the new distributed unit to the radio unit.

15. The non-transitory machine-readable medium of claim 14, wherein accessing the mapping data structure is performed by a director process of the switch that couples radio units to active distributed units.

16. The non-transitory machine-readable medium of claim 14, wherein physical random access channel handler further assigns an active distributed unit to the radio unit.

17. The non-transitory machine-readable medium of claim 16, wherein the operations further comprise maintaining the mapping data structure to relate the active distributed unit to the radio unit.

18. The non-transitory machine-readable medium of claim 14, wherein the radio unit is a first radio unit, and wherein the operations further comprise performing a handover of the user equipment to a second radio unit, determining, based on an identity of the second radio unit, that no distributed unit is actively associated with the second radio unit, and in response to the determining that no distributed unit is actively associated with the second radio unit, associating a distributed unit with the second radio unit to handle communications with the second radio unit.

19. The non-transitory machine-readable medium of claim 18, wherein the operations further comprise determining that the first radio unit has entered an idle state with respect to not serving any active user equipment, and in response to the determining that the first radio unit has entered the idle state, disassociating the distributed unit from the first radio unit, and broadcasting control information to the first radio unit.

* * * * *